United States Patent
Taylor et al.

(10) Patent No.: US 10,096,059 B2
(45) Date of Patent: Oct. 9, 2018

(54) INTERACTIVE SELF-SERVICE (SS) DISPLAY

(71) Applicant: NCR Corporation, Duluth, GA (US)

(72) Inventors: Jason Wayne Taylor, Suwanee, GA (US); Harold George Bolich, III, Tyrone, GA (US)

(73) Assignee: NCR Corporation, Atlanta, GA (US)

( * ) Notice: Subject to any disclaimer, the term of this patent is extended or adjusted under 35 U.S.C. 154(b) by 69 days.

(21) Appl. No.: 14/184,162

(22) Filed: Feb. 19, 2014

(65) Prior Publication Data

US 2015/0235303 A1 Aug. 20, 2015

(51) Int. Cl.
G06Q 30/00 (2012.01)
G06Q 30/06 (2012.01)
G06Q 30/02 (2012.01)

(52) U.S. Cl.
CPC ..... *G06Q 30/0641* (2013.01); *G06Q 30/0268* (2013.01)

(58) Field of Classification Search
CPC .................................................. G06Q 30/0268
See application file for complete search history.

(56) References Cited

U.S. PATENT DOCUMENTS

| | | | | |
|---|---|---|---|---|
| 6,932,270 B1* | 8/2005 | Fajkowski | ........... | G06Q 20/387 235/381 |
| 6,973,437 B1* | 12/2005 | Olewicz et al. | ................ | 705/15 |
| 8,462,212 B1* | 6/2013 | Kundu | ..................... | H04N 7/18 348/150 |
| 2002/0173972 A1* | 11/2002 | Daniel | ................... | G06Q 30/02 705/1.1 |
| 2003/0029065 A1* | 2/2003 | Haghighi | .............. | G09F 11/025 40/493 |
| 2003/0236890 A1* | 12/2003 | Hurwitz et al. | .............. | 709/227 |
| 2005/0004836 A1* | 1/2005 | Ruttenberg | ............ | G06Q 30/02 705/14.42 |
| 2007/0116299 A1* | 5/2007 | Vanderwall et al. | ........... | 381/86 |
| 2008/0162276 A1* | 7/2008 | Nguyen | ................. | G06Q 50/12 705/14.66 |
| 2009/0216652 A1* | 8/2009 | Eggert | ................... | G06Q 20/20 705/23 |
| 2011/0161184 A1* | 6/2011 | Lutz | ....................... | G06Q 20/20 705/16 |

* cited by examiner

*Primary Examiner* — Eric R Netzloff
*Assistant Examiner* — Scott C Anderson
(74) *Attorney, Agent, or Firm* — Schwegman, Lundberg & Woessner

(57) ABSTRACT

Interactive Self-Service (SS) display mechanisms are provided. A SST includes a first display and a second display. The first display is operable to present information relevant to a transaction at the SST. The second display is operable to simultaneously present information relevant to a status of the SST and information unrelated to the status.

18 Claims, 4 Drawing Sheets

INTERACTIVE SELF-SERVICE (SS) DISPLAY

BACKGROUND

Increasingly consumers are conducting financial transactions through Self-Service Terminals (SSTs) without the assistance of a clerk. In fact, in many cases these transactions are conducted without any store staff in the vicinity of the SSTs.

Although technology from SST transactions has advanced significantly in recent years, one aspect of SST transactions has remained relatively static and unchanged. This area is associated with SST lane signs/lamps that provide information about a status of an SST to customers and store staff in a binary fashion.

For example, most SST lane signs/lamps have painted SST number identifiers that are elevated above the SST lane to which they are associated. The signs may also have a status indicator for an "open" or a "closed" status. The signs/lamps user, perhaps, different color lights to illuminate the SST lane numbers and status indicator.

Such arrangements fail to provide any valuable information to a customer or to store staff that services the SSTs. Moreover, these arrangements are inflexible, such that current configurations are incapable of communicating any truly interactive information to the customers and store staff.

Furthermore, the SSTs are devices having processing, memory, and storage capabilities. These resources are often grossly underutilized by the store, since SSTs are infrequently loaded with a steady and consistent stream of customers. Also, even if a customer is transacting on an SST, the SST resources could easily handle additional processing responsibilities for the store, which can be related to the transaction or entirely unrelated to the transaction.

Additionally, product placement and advertisements provide a store with a needed and lucrative revenue source from vendors. Stores would be very interested in expanding such revenues without occupying any new space within the store and without entailing any significant additional investment/resources to accomplish such revenues.

SUMMARY

In various embodiments, interactive Self-Service (SS) display mechanisms are presented.

According to an embodiment, information for presentation is identified on an SST. The SST causes the information to be presented on a display in proximity to the SST; the display independent of and different from a transaction display of the SST.

DETAILED DESCRIPTION

Figure 1:
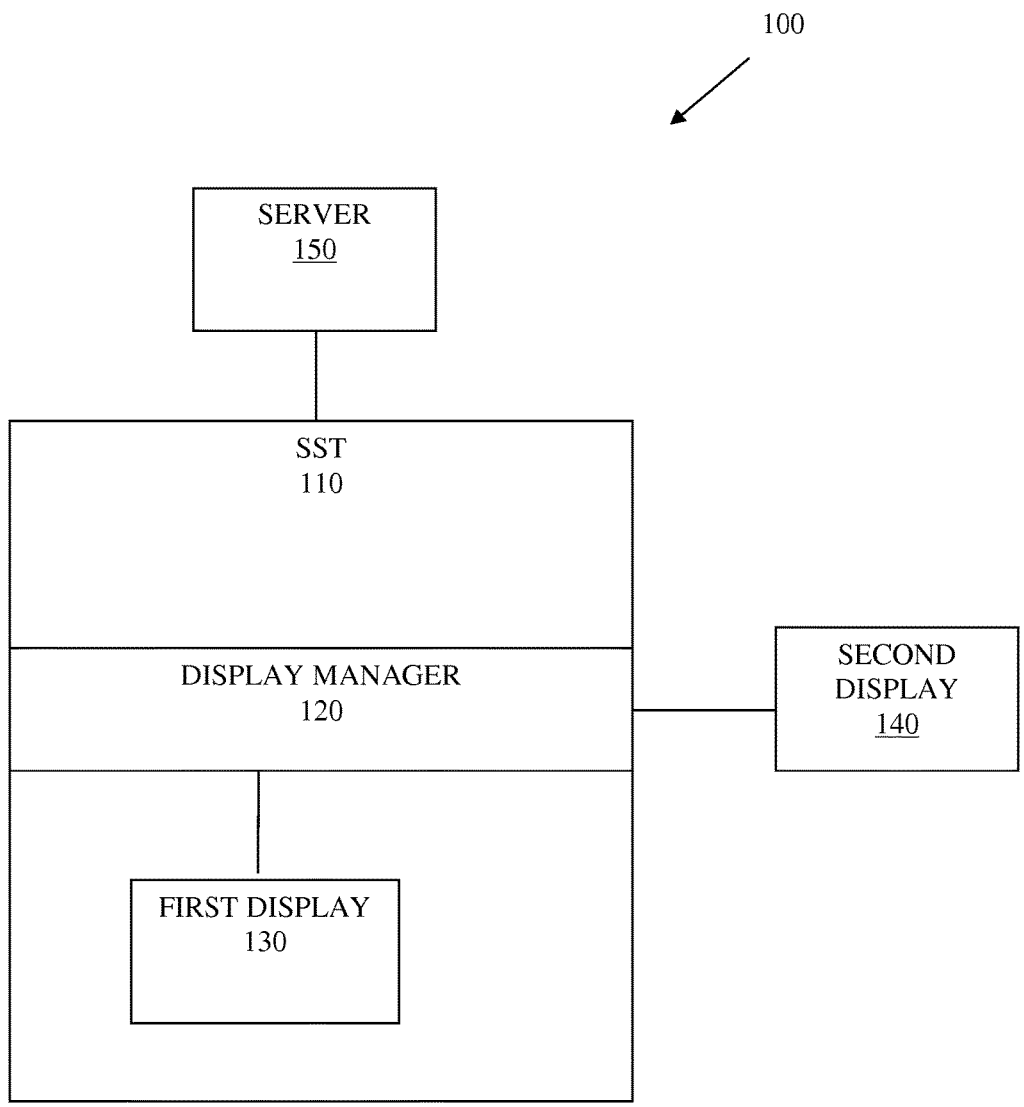
FIG. 1 is a diagram of an example architecture for practicing SS display mechanisms, according to an example embodiment.

FIG. 1 is a diagram of an example architecture 100 for practicing SS display mechanisms, according to an example embodiment. The various components are illustrated and the arrangement of the components is presented for purposes of illustration only. It is to be noted that other arrangements with more or less components are possible without departing from the onsite automated customer assistance teachings presented herein and below.

The techniques, methods, and system presented herein and below for end-to-end device authentication can be implemented in whole or in part in one, all, or some combination of the components shown with the architecture 100. The techniques and methods are programmed as executable instructions in memory and/or non-transitory computer-readable storage media and processed on one or more processors associated with the various components.

The discussion of the architecture 100 is within the context of a retail establishing having one or more SSTs. It is noted that the architecture 100 is also applicable to any industry employing SSTs, such as but not limited to, government agencies, entertainment venues, transportation agencies, non-profit organizations, education facilities, etc. Thus, the description that follows below is but one embodiment of the invention and it not intended to limit the invention to only retail-based SSTs.

The example architecture 100 includes an SST 110 and, optionally, a server 150. The SST 110 includes a display manager 120, a first display 130, and a second display 140 (in proximity to the SST 110 and controlled by the display manager 120).

The SST 110 is presented in greatly simplified form and is used to illustrate only those portions of components used for purposes of achieving an interactive SST display (identified as second display 140 in the FIG. 1).

The SST 110 includes one or more resources, such as: processor(s), memory, storage, scanners, input mechanisms, software, displays, loading bay, scale for weighing items, and the like. A customer utilizes the SST 110 to perform a transaction at a retail establishment (store). The store may have a plurality of SSTs (not shown in the FIG. 1) networked together, perhaps, through an optional store server 150. Each SST 110 includes its own defined area in proximity to the SST 130 display; this area is referred to here as the "SST lane" or "SST checkout area."

A typical SST would include the first display 130 but not a second display 140; rather, the typical SST includes a lighting mechanism and a sign with limited painted information on the sign that illuminates by the lighting mechanism to highlight the limited information on painted on the sign. This sign is typically elevated about the SST lane and provides an indication for an identifier for the SST (such as #1) and an indication as to whether the SST lane is open or closed for customer traffic.

However, embodiments of the present invention utilize a display manager 120, a second display 140, and, in some cases, a server 150 to provide related and unrelated information relevant to the SST 110, SST lane, maintenance of the SST 110, advertisements, and any other custom information to customers and store staff. This second display 140 is interactive because presentation on screens of the second display 140 can be dynamically altered and represent any presentation media type. Moreover, the presentation on the screens can occur during customer transactions at the SST 110, when the SST 110 needs service, and/or when the SST 100 is closed. The interactive SST 110 has the second display 140 presentations controlled by the display manager 120 and/or the server 150.

The display manager 120 is programmed in memory and/or a non-transitory computer-readable storage medium for execution on one or more processors of the SST 110. The display manager 120 controls how, what, and when information is presented on screens of the interactive second display 140.

In an embodiment, the display manager 120 is preconfigured with preference display information and policy conditions that when evaluated permit the display manager 10 to determine: when selected information is to be identified for presentation on the interactive second display 140 (based on instruction from the policy conditions that may include detected events (such as SST 110 is offline, SST 110 is online and unoccupied, current date is within a predetermined range of a known holiday, SST queue line has N people in it at present time, SST 110 is in need of paper for the receipt dispenser, etc.)); what is to be the selected information to present on the interactive second display 140 (based on a file reference in the preference display information identified by evaluation of a policy condition); and how the selected information is presented on the interactive second display 140 (based on the media type of the selected information (video, text instructions, image of an advertisement, etc.).

In an embodiment, the display manager 120 alters information presented on the interactive second display 140 based on instructions sent from the server 150. Moreover, the server 150 can override actions of the display manager 120. The server 150 may also report events to the display manager 120 that alter evaluation of the policy conditions. Still further, the server 150 may dynamically deploy the policy conditions and the preference display information to the SST 110 for access and evaluation by the display manager 120. In some cases, the display manager 120 dynamically acquires the preference display information in real time from the server 150. The server 150 may also stream in real time the preference display information to the display manager 120.

In an embodiment, the display manager 120 reports a state of the SST 110 and/or SST lane to the server 150 and the server performs policy evaluations and determines what to present, how to present, and when to present, which is then communicated back to the display manager 120 for presentation on the second display 140.

In an embodiment, the display manager 120 and the server 150 cooperate with each having a set of policy conditions for evaluation in resolving what to present, how to present, and when to present.

According to an embodiment, the display manager 120 cooperates with other SSTs (not shown in the FIG. 1), each SST 110 having an independent executing instance of the display manager 120 and the networked SSTs 110 (though instances of the display manager 120) determine what to present, how to present, and when to present. The networked SSTs 110 can also regularly and in real time communicate state for each SST 110 and each SST lane condition to remaining ones of the networked SSTs 110. In one case for this embodiment, the server 150 is used to update the SSTs 110 with information that is to be presented on screens of the second displays 140 as well as the policy conditions. The frequency of update can be controlled by store staff and can range from several times a day to once a week or month. On demand updates can occur as needed as well outside a scheduled frequency update.

A "state" of an SST 110 includes a variety of configured information, such as but not limited to: current status of the SST 110 (offline, in need of maintenance for peripheral devices of for media, ink, clear paper jab, clean scanning glass, recalibrate measuring devices, customer-activated an assistance request, identification check for purchase of alcohol or tobacco products, a software resource on the SST 110 is hanging or malfunctioning, customer failed to scan an item (as detected by sensors or cameras interfaced to the SST 110), and the like) and current status of the SST lane (utilizing sensors or cameras interfaced to the SST 110) to detect a spill or a total number of people in a queue at the SST 110 or a queue for a next available SST.

Moreover, the display manager 120 can simultaneously present multiple different types of information in different screens of the interactive second display 140. For example, the display manager 120 may simultaneously present on: a first screen of the interactive display 140 an SST lane identifier, on a second screen a status for the SST 110, on a third screen a status for the SST lane, and a fourth screen a video advertisement. It may also be that some screens simultaneously presented on the interactive display 140 are controlled by the display manager 120 where other screens are controlled by the server 150.

The presentation on the interactive second display 140 is not impacted by any transaction simultaneously occurring on the SST 130 and being transacted with a customer through the first display 130 (may be touch enabled).

Also, the "transaction" can be with a customer or with store staff servicing the SST 110. In this manner a video, audio, images, graphics, and textual presentations on how to perform maintenance on the SST 110 can appear for the store staff on screens of the second display 140 while the staff performs the maintenance on the SST 110 (recalibrating devices, cleaning devices, swapping out devices, replenishing media (ink, paper, etc.), clearing paper jams, etc.). So, some or all of the presentations within the screens of the interactive display 140 can be related to the transaction and/or unrelated to the transaction occurring on the SST 110.

The interactive display 140 can be a monitor device with or without interfaced speakers, microphones, and/or cameras. In an embodiment, the monitor device is also touch enabled for customer interaction (the monitor device acting as a digital sign). In an embodiment, the interactive second display is a projection mechanism that projects onto a translucent projection screen for visibility. In this latter embodiment, the display manager 120 interacts with a projector interfaced to the SST 110 to provide the information and relevant presentation screen locations onto regions of the translucent projection screen. Moreover, when the interactive second display 140 is a projection mechanism minimal retrofitting and equipment may be required to deploy the mechanism within a store and existing store configurations for the SSTs can be utilized.

In an embodiment, the interactive second display 140 is organized into 2 to 4 panels, each panel facing a different direction within the store and each panel having one or more screens with independent, some, or all overlapping information. This can be done via monitor devices or via projection mechanisms (discussed above).

The interactive second display 140 is in physical proximity to the SST 110 or the SST lane. For example, the interactive second display 140 can be elevated above the SST lane for viewing from significant distances by customers and staff within the store. In another case, the interactive second display is situated at the front of the SST lane, such that it is visible upon entering a pool of SSTs 110.

In an embodiment, the interactive second display 140 is logically partitioned to service at least two independent SSTs 110; each SST's display manager 120 controlling a region on the interactive and shared second display 140. This may be useful when the interactive second display 140 is particularly large enough such that presentations provided by each SST 110 sharing the display 140 can be provided without impacting discernment of the customers or store staff.

One now appreciates how an enterprise can utilize existing underutilized computing resources of SSTs 110 to provide an interactive SST display that can provide a variety of information in a variety of formats to customers and enterprise staff.

It is noted that other arrangements for the interactive SST displays 140 can be used as well without departing from the teachings presented herein.

These (above-discussed) embodiments of the interactive SST display 140 and other embodiments are now discussed with reference to the FIGS. 2-4.

Figure 2:
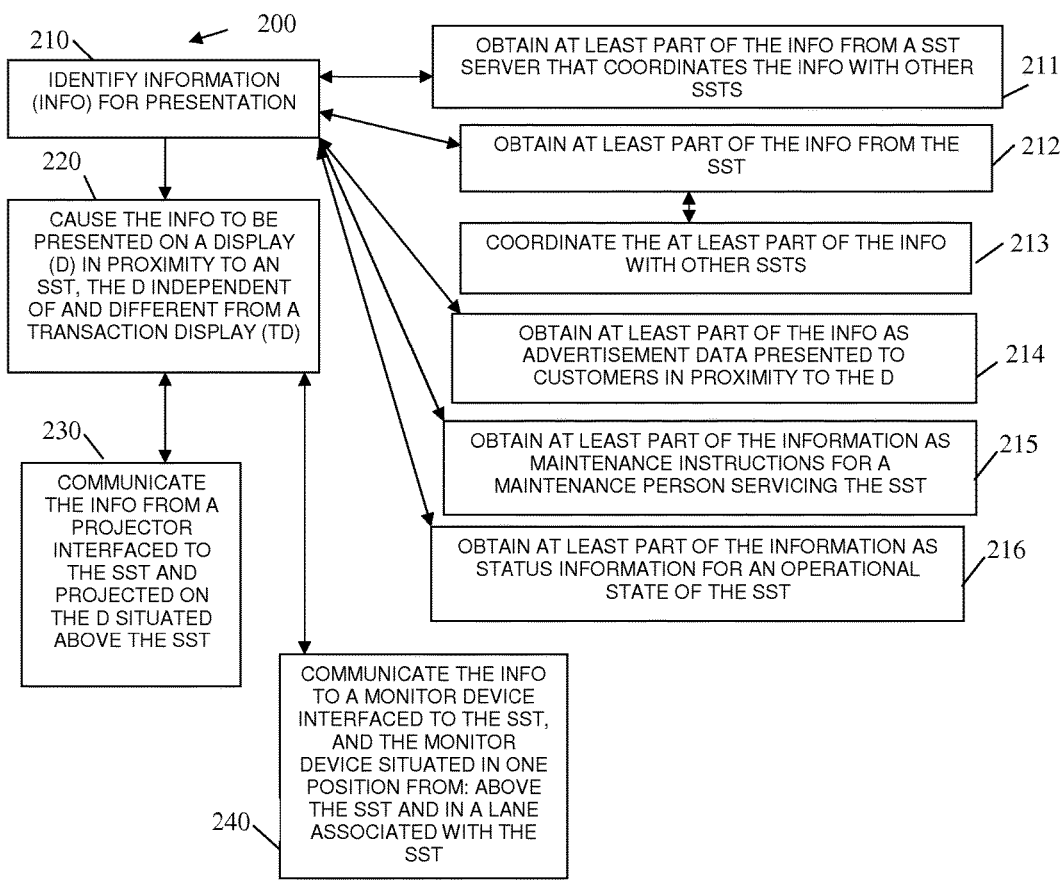
FIG. 2 is a diagram of a method for a SS display mechanism, according to an example embodiment.

FIG. 2 is a diagram of a method 200 for a SS display mechanism, according to an example embodiment. The software module(s) that implements the method 200 is referred to as a "SST display manager." The SST display manager is implemented as executable instructions programmed and residing within memory and/or a non-transitory computer-readable (processor-readable) storage medium and executed by one or more processors of a SST. The processor(s) of the SST that executes the SST display manager are specifically configured and programmed to process the SST display manager. The SST display manager has access to one or more networks during its processing. The networks can be wired, wireless, or a combination of wired and wireless.

In an embodiment, the SST display manager is the display manager 120 of the FIG. 1.

At 210, the SST display manager identifies information for presentation within one or more screens of a display, such as display 140 of the FIG. 1.

According to an embodiment, at 211, the SST display manager obtains at least part of the information from a SST server, such as SST server 150 of the FIG. 1. The SST server coordinates the information or portions of the information with the SST and other SSTs networked together within an enterprise facility.

In an embodiment, at 212, the SST display manager obtains at least part of the information from a local storage environment of the SST.

In an embodiment of 212 and at 213, the SST display manager coordinating the at least part of the information with other networked SSTs to the SST.

In an embodiment, at 214, the SST display manager obtains at least part of the information as advertisement data presented to customers in proximity to the display.

In an embodiment, at 215, the SST display manager obtains at least part of the information as maintenance instructions for a maintenance person servicing the SST.

In an embodiment, at 216, the SST display manager obtains at least part of the information as status information for an operational state of the SST and/or for lane conditions at the SST.

At 220, the SST display manager causes the information to be presented on a display, which is in proximity to the SST. Moreover, the display is independent of and different from a transaction display of the SST, which is utilized for transactions occurring at the SST.

According to an embodiment, at 230, the SST display manager communicates the information from a projector interfaced to the SST and projected on the display (the display being a translucent projection screen having one or more panels, each panel can have the same information presented thereon, some of the same information presented thereon, or different information presented thereon). The display situated above the SST or the SST lane.

In an embodiment, at 240, the SST display manager communicates the information to a monitor device interfaced to the SST, and the monitor device situated one position from: above the SST and in a lane associated with the SST. The monitor device can have one or multiple display panels (each panel can have the same information presented thereon, some of the same information presented thereon, or different information presented thereon).

Figure 3:
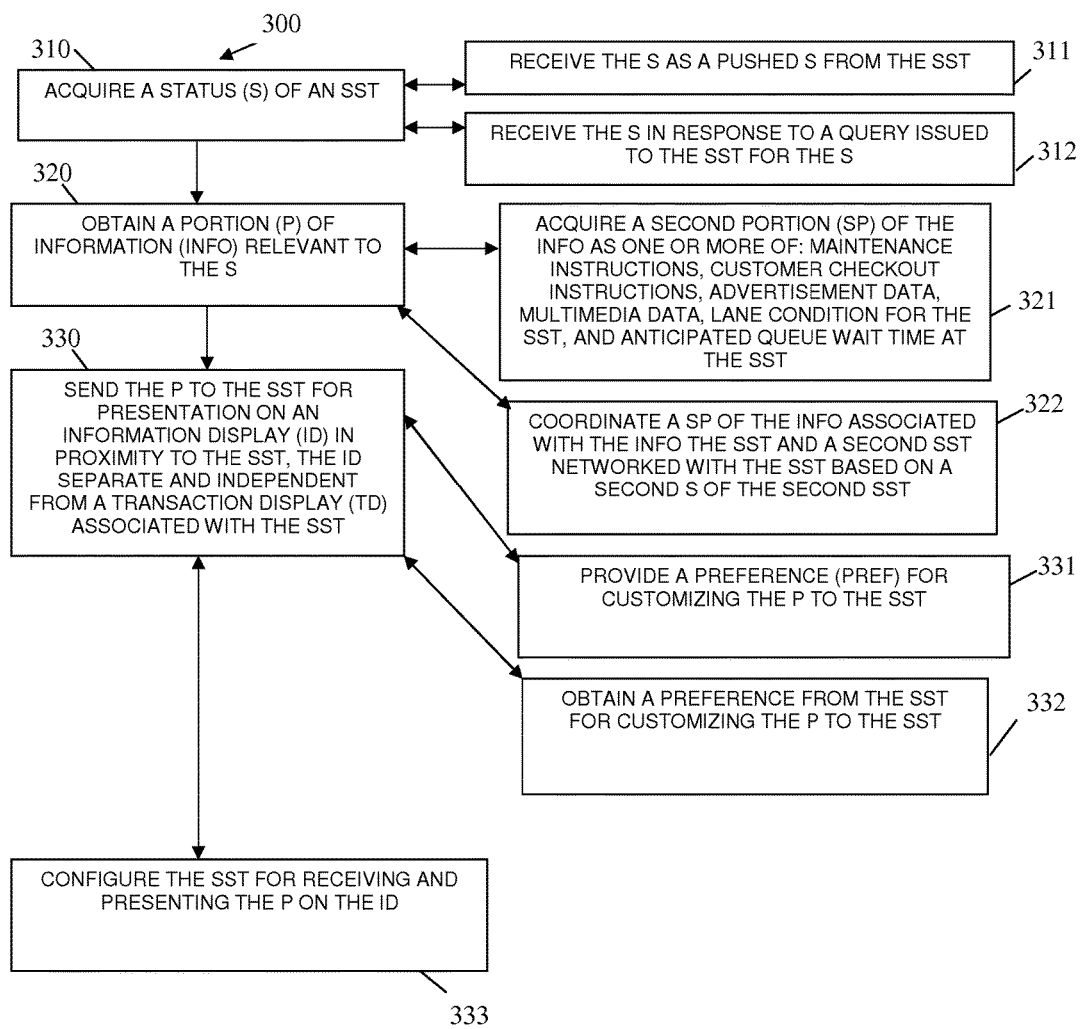
FIG. 3 is a diagram of another method for a SS display mechanism, according to an example embodiment.

FIG. 3 is a diagram of another method 300 for a SS display mechanism, according to an example embodiment. The software module(s) that implement the method 300 is referred to herein as a server display manager. The server display manager is implemented as executable instructions and programmed within memory and/or a non-transitory computer-readable (processor-readable) storage medium that executes on one or more processors of a server. The processors of the server are specifically configured to execute the server display manager. The server display manager can access one or more networks; the networks can be wired, wireless, or a combination of wired and wireless.

In an embodiment, the server that processes the host validator is host server 150 of the FIG. 1.

At 310, the server display manager acquires a status of an SST. The status can be for operational state for the SST and/or lane state for the SST lane. This was discussed at length above with reference to the FIG. 1.

According to an embodiment, at 311, the server display manager receives the status as a pushed status from the SST, such as from the display manager 120 of the FIG. 1 or the SST display manager of the FIG. 2. The pushed status was unsolicited by the server display manager or the pushed status was configured into the SST to determine when and a frequency for which the pushed status is to be sent from the SST.

In an embodiment, at 312, the server display manager receives the status in response to a query issued to the SST for the status, such as from the display manager 120 of the FIG. 1 or the SST display manager of the FIG. 2.

At 320, the server display manager obtains a portion of information relevant to the status (other portions of the information may be unrelated to the status).

In an embodiment, at 321, the server display manager acquires a second portion of the information as one or more of: maintenance instructions for the SST, customer checkout instructions at the SST, advertisement data, multimedia data, lane condition for the SST, and anticipated queue wait time at the SST.

In an embodiment, at 322, the server display manager coordinates a second portion of the information associated with the information with the SST and a second SST networked with the SST based on a second status for the second SST. So, the server display manager coordinates information between networked SSTs.

At 330, the server display manager sends the portion of the information obtained at 320 to the SST for presentation on an information display in proximity to the SST. The information display is separate and independent from a transactional display associated with the SST.

In an embodiment, at 331, the server display manager provides a preference for customizing the portion of information to the SST. The preference can include such things as the SST's identification number, lane condition, information display capabilities, and location of the SST to items that the enterprise is attempting to sale or discount and in view of customers at the SST, and the like.

In an embodiment, at 332, the server display manager obtains a preference (described above at 331) from the SST for customizing the portion of information on behalf of the SST.

In an embodiment, at 333, the server display manager configures the SST for receiving and presenting the portion of the information on the information display. This may include scripts to process multimedia data, which the SST is to execute, locations or links to obtain the portion of information, media types, screen locations within the information display, regions of the information display for each screen location as well as sizes for each screen, and the like.

Figure 4:
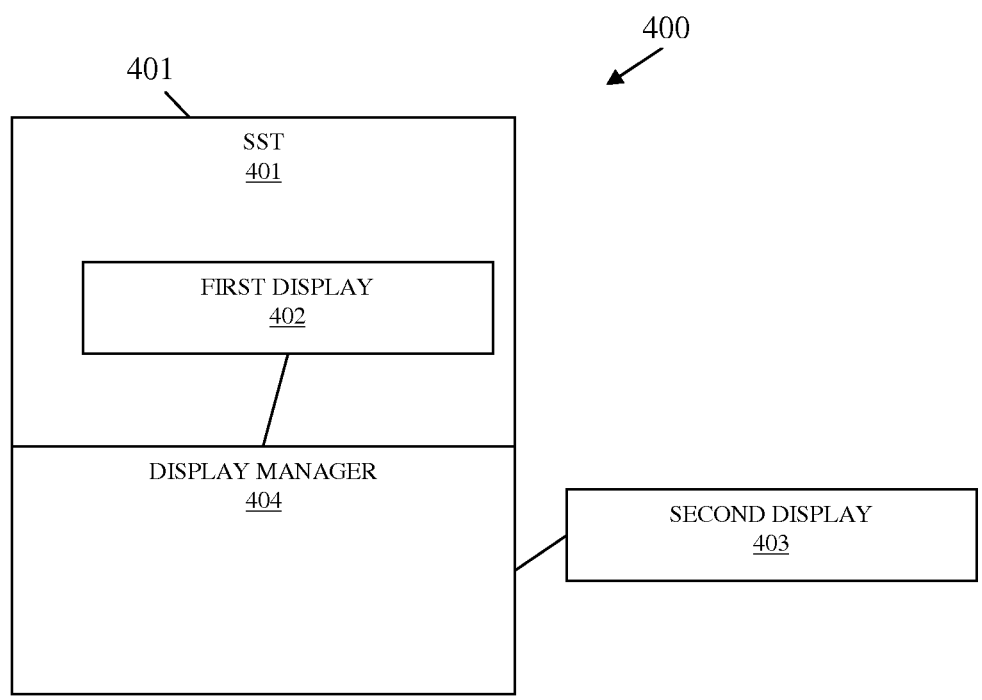
FIG. 4 is a diagram of a SS display system, according to an example embodiment.

FIG. 4 is a diagram of a SS display system 400, according to an example embodiment. The components of the SS display system 400 are programmed and reside within memory and/or a non-transitory computer-readable medium and execute on one or more processors of a SST 401. The SS display system 400 has access and can communicate over one or more networks; and the networks can be wired, wireless, or a combination of wired and wireless.

The SS display system 400 includes an SST 401, a first display 402, a second display 403, and a display manager 404.

The SST 401 includes a variety of resources, such as but not limited to: processor(s), memory, storage devices, peripherals (weighing devices, sensors, scanners, input mechanisms, credit card readers, the first display 402, the second display 403, the display manager 404, a camera, a microphone, and other software and hardware resources.

In an embodiment, the SST 401 is the SST 110 of the FIG. 1.

The first display 402 is provided for transaction processing at the SST 401 by a customer or by enterprise staff that services the SST 401. So, the first display 402 is operable to present transaction information and interact with a user (via an input mechanism, touch screen, credit card reader, keyboard, scanner, weighing device, and the like) for a transaction occurring on the SST 401.

The second display 403 is provided for providing a variety of interactive information and feedback, which may or may not be related to an existing transaction at the SST 110.

In an embodiment, the second display 403 is a translucent projection screen that a projector interfaced to the SST 401 projects onto during the transaction or when no transaction at all is occurring on the SST 401.

In an embodiment, the second display 403 is a monitor device.

In an embodiment, the second display 403 includes one or more panels, each panel presenting the same information, some part of the same information, or different information. Each panel facing a different direction from remaining panels.

In an embodiment, the display manager 404 is programmed within memory or a non-transitory computer-readable storage medium of the SST 401 for execution on one or more processors of the SST 401.

In an embodiment, the display manager 404 is programmed within memory or a non-transitory computer-readable storage medium of an SST server (such as SST server 150 of the FIG. 1) for execution on one or more processors of the SST server.

In an embodiment, the display manager 404 is the display manager 120 of the FIG. 1.

In an embodiment, the display manager 404 is the SST display manager of the FIG. 2.

In an embodiment, the display manager is the server display manager of the FIG. 3.

The display manager 404 is operable to present a portion of information relevant to a status of the SST 401 on the second display 403 during the transaction or when no transaction is occurring at all on the SST 401.

According to an embodiment, the display manager 404 is further operable to present a second portion of the information that is unrelated to the status simultaneously on the second display 403 during the transaction or while no transaction is occurring at all on the SST 401.

One now appreciates how an interactive SST display mechanism can be achieved that takes advantage of underutilized resources of SSTs and communicates information to customers and enterprise staff related and unrelated to transaction processing at the SSTs.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented as executable instructions residing in a non-transitory computer readable storage medium, the executable instructions representing a display manager and the executable instructions executed by one or more processors of a Self-Service Terminal (SST), the method comprising:

identifying, by the display manager executing on the one or more processors of the SST, information for presentation, wherein identifying further includes obtaining at least a part of the information from an SST server that coordinates the part of the information with the SST and other SSTs over a network;

causing, by the display manager, the information to be presented on a display that is one of: i) elevated above an SST lane for the SST and ii) situated at a front of the SST lane, and controlling, by the display manager the display as an additional display that is independent of and different from a transaction display of the SST, and interacting, by the display manager, over a network connection with the display from the SST, and controlling, by the display manager, the information as different information from what is also being presented on the transaction display, and providing, by the display manager the information as feedback for a transaction being processed on the SST, and controlling, by the display manager, the display as a display organized into 2 to 4 panels and managing, by the display manager, presentations provided by the display manager with each presentation on each panel having at least some independent information from remaining panels of the display; and evaluating, by the display manager, policy conditions for determining by the display manager specific information for presenting on each panel when the SST: is offline, is online and unoccupied, has a current date within a predetermined range of a known holiday, has a queue of customers that at least a predefined number of people, and is need of paper for a receipt dispenser.

2. The method of claim 1, wherein identifying further includes obtaining a second part of the information from the SST.

3. The method of claim 2, wherein obtaining further includes coordinating the second part of the information with the other SSTs.

4. The method of claim 1, wherein identifying further includes obtaining a second part of the information as advertisement data presented to customers in proximity to the display.

5. The method of claim 1, wherein identifying further includes obtaining a second part of the information as maintenance instructions for a maintenance person servicing the SST.

6. The method of claim 1, wherein identifying further includes obtaining a second part of the information as status information for the operational state of the SST.

7. The method of claim 1, wherein causing further includes communicating the information from a projector interfaced to the SST and projected on the display situated above the SST.

8. The method of claim 1, wherein causing further includes communicating the information to a monitor device interfaced to the SST and the monitor device situated in one position from one of: above the SST and in a lane associated with the SST.

9. A method implemented as executable instructions residing in a non-transitory computer readable storage medium, the executable instructions representing a Self-Service Terminal (SST) display manager and the executable instructions executed by one or more processors of a server, the method comprising:

acquiring, by the SST display manager executing on the one or more processors of the server, a status of a SST through a network connection from the server to the SST, wherein acquiring further includes acquiring the status as state information for the SST and the state information is pre-configured types of information for the SST to provide as the state;

obtaining, by the SST display manager, a portion of information for the status;

sending, by the SST display manager, the portion of information to the SST for presentation on an information display that is one of: i) elevated above an SST lane for the SST and ii) situated at a front of the SST lane in proximity to the SST, and controlling, by the SST display manager, the information display separately from and independently of a transaction display for the SST and presenting, by the SST display manager, the portion on the information display as a different presentation from what is presented on the transaction display and presenting, by the SST display manager, another portion of the information on the information display as feedback information for the transaction being processed on the SST, and controlling, by the SST display manager, as 2 to 4 panels with each panel facing a different direction and managing, by the SST display manager, presentations within each panel independently and separately with at least some of the information presented within each panel being independent of what is presented in remaining panels;

coordinating, by the SST display manager, other information for presentation within other information displays of other SSTs networked over a network connection; and evaluating, by the SST display manager, policy conditions for determining by the display manager specific information for presenting on each panel based on when the SST: is offline, is online and unoccupied, has a current date within a predetermined range of a known holiday, has a queue of customers that at least a predefined number of people, and is need of paper for a receipt dispenser.

10. The method of claim 9, wherein acquiring further includes receiving the status as a pushed status from the SST.

11. The method of claim 9, wherein acquiring further includes receiving the status in response to a query issued to the SST for the status.

12. The method of claim 9, wherein obtaining further includes acquiring a second portion of the information as one or more of: maintenance instructions, customer checkout instructions, advertisement data, multimedia data, lane condition for the SST, and anticipated queue wait time at the SST.

13. The method of claim 9, wherein obtaining further includes coordinating a second portion associated with the information with the SST and a second SST networked together with the SST based on a second status of the second SST.

14. The method of claim 9, wherein sending further includes providing a preference for customizing the portion to the SST.

15. The method of claim 9, wherein sending further includes obtaining a preference from the SST for customizing the portion to the SST.

16. The method of claim 9 further comprising, configuring the SST for receiving and presenting the portion on the information display.

17. A system, comprising:

a Self-Service Terminal (SST);

a first display interfaced to the SST, the first display operable to present transaction information for a transaction occurring on the SST;

a second display interfaced to the SST; and a display manager executing on one or more processors of: the SST, the display manager configured to: i) present a portion of information for a status of the SST on the second display during the transaction, wherein the status is state information for the SST and the state information is pre-configured types of information for the SST to provide as the state, ii) interface with and networked to the second display, and present the portion of information presented on the second display as being different from what is presented on the first display, and receive that portion of information at least partially from the SST, and present the portion of the information as feedback information associated with the transaction information that is being presented on the first display for the transaction, and control the second display as 2 to 4 panels with each panel facing a different direction and manage each panel separately and independently and present at least some of the information presented within each panel that is independent of what is presented in remaining panels, and iii) coordinate presentation of other statuses for other SSTs on other displays of the other SSTs over a network connection to the other SSTs and from the SST, and wherein the display manager is further configured to evaluate policy conditions for determining by the display manager specific information for presenting on each panel based on when the SST: is offline, is online and unoccupied, has a current date within a predetermined range of a known holiday, has a queue of customers that at least a predefined number of people, and is need of paper for a receipt dispenser.

18. The system of claim 17, wherein the display manager is further operable to present a second portion of the information that is unrelated to the status simultaneously on the second display with the portion during the transaction, and wherein the second display is a screen that a projector interfaced to the SST projects onto during the transaction.

\* \* \* \* \*